Dec. 8, 1925.                                               1,564,743
                    H. H. ADLER
       MEANS FOR DETERMINING COLOR COMBINATIONS
              Filed June 30, 1921    2 Sheets-Sheet 1

Hazel H. Adler
                       INVENTOR.

BY Gifford & Bull
            her ATTORNEYS

Patented Dec. 8, 1925.

1,564,743

UNITED STATES PATENT OFFICE.

HAZEL H. ADLER, OF NEW YORK, N. Y.

MEANS FOR DETERMINING COLOR COMBINATIONS.

Application filed June 30, 1921. Serial No. 481,607.

*To all whom it may concern:*

Be it known that I, HAZEL H. ADLER, a citizen of the United States, residing in New York city, in the county of New York and State of New York, have invented certain new and useful Improvements in Means for Determining Color Combinations, of which the following is a specification.

My invention relates to new and useful improvements for ascertaining and determining harmonious combinations of colors, or shades or tints of colors, and more particularly contemplates a simplified device for determining harmonious combinations in accordance with the principle set forth in Patent No. 1,308,512, dated July 1, 1919, which was granted to Henry Fitch Taylor.

The primary object of my invention, among other objects which will appear hereinafter, is to provide means for the mechanical selection of harmonious colors, and this is illustrated as accomplished by a device which is extremely simple in construction, form and operation, and which will be inexpensive of manufacture.

My invention consists of certain novel parts and combinations of parts particularly pointed out in the claims.

The following is a description of a device embodying my invention in the form at present perferred by me, but it will be understood that various changes may be made therein without departing from my invention and without exceeding the scope of my claims.

I have fully and clearly illustrated my invention in the accompanying drawings to be taken as a part of this specification, and wherein—

Figure 1:
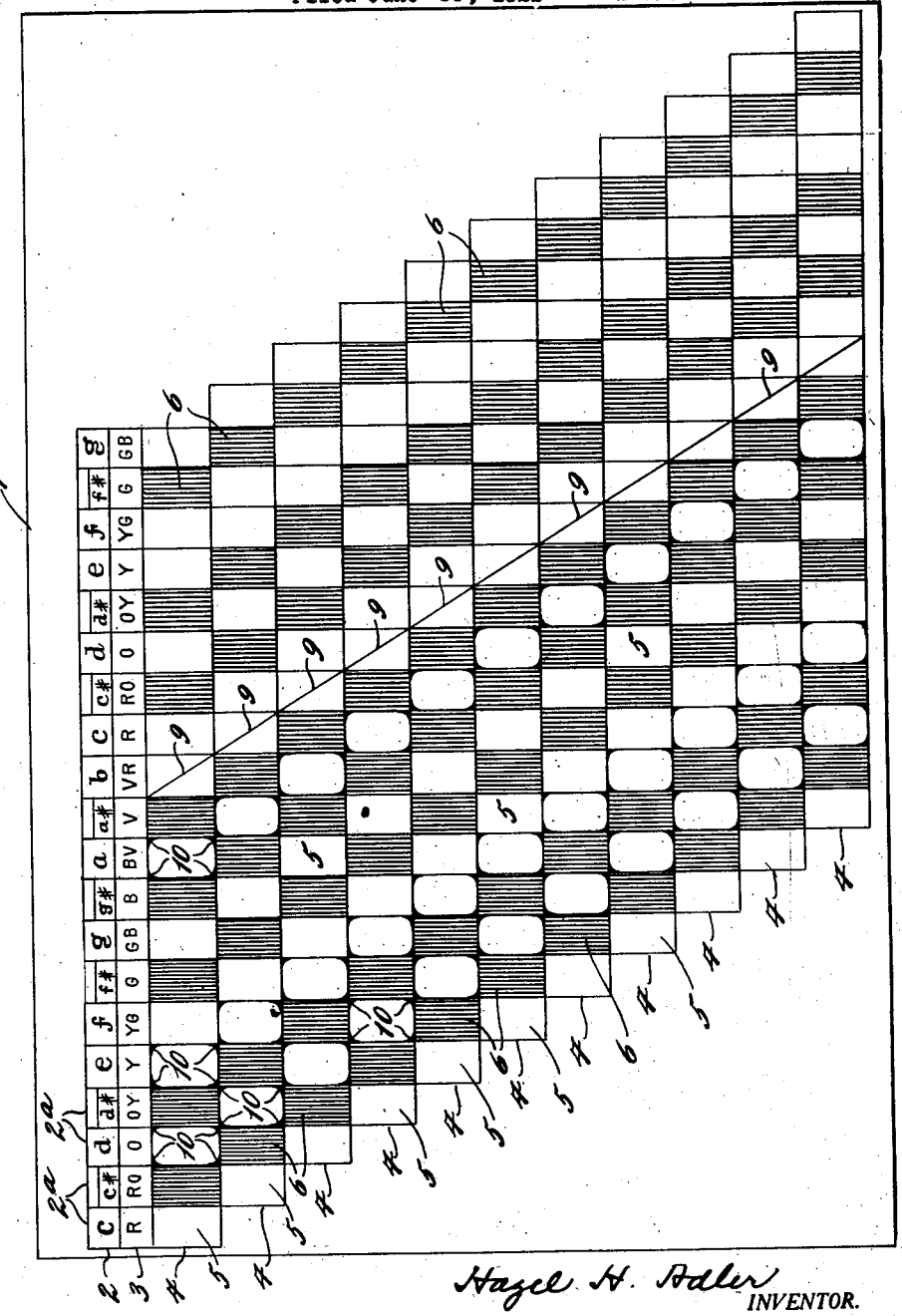
Figure 1 is a plan view of a chart constructed and arranged according to my invention.

Referring to the drawings by characters of reference, 1 designates a plate or board forming the body or ground of the chart, and which may be of cardboard, paper, or any other material suitable for the purpose. Upon this chart is arranged a horizontally extending row or series 2 of indications, preferably in the form of areas 2ª, preferably rectangular in form, and of equal width, said areas corresponding in sequence to the notes of the chromatic musical scale, and containing the musical designations of such scale from "C" to "B", with the intermediate half-tones C#, etc., according to the usual designations employed to designate the notes and half-notes of a chromatic scale. It will be understood that the areas 2ª constitute twelve divisions equally spaced and proportioned to the twelve half-spaces or tones of the chromatic musical scale. In the embodiment illustrated I have shown a complete scale beginning with the C note and extending in sequence through the B note at the end of the scale, and followed by a portion of a chromatic scale beginning with the C note and extending in sequence in equally spaced areas to and through the G note for a purpose to be presently described. Beneath the indications or areas 2ª is arranged a horizontally disposed series of indications, preferably in the form of areas 3, corresponding to, and in vertical alinement, respectively, with, the areas 2ª, heretofore described, so that beneath each of the areas 2ª is located one of the areas or spaces 3. These areas 3 correspond to and represent in sequence the colors of a spectrum, and may be colored by paint, printing, or otherwise, to depict such colors, or, as shown in the drawings, may contain, respectively, letters or other indications designating such colors. In the present embodiment the colors of the spectrum, corresponding to the chromatic scale notes from C to B, are in sequence indicated as follows:

R under note C indicates red; RO under note C# indicates red orange; O under note D indicates orange; OY under note D# indicates orange yellow; Y under note E indicates yellow; YG under note F indicates yellow green; G under note F# indicates green; GB under note G indicates green blue; B under note G# indicates blue; BV under note A indicates blue violet; V under note A# indicates violet, and VR under note B indicates violet red.

The corresponding color designations under the second chromatic scale, or the portion thereof following that just described, are in a similar arrangement and relation. This series of areas 3 constitutes a scale of color corresponding to the chromatic scale in music. It will be understood that the color areas of the spectrum bear the same relation to each other irrespective of the pitch of color which may constitute the colors of the spectrum, so that the colors may be true to those contained in the spectrum, or may be of a higher or lower pitch or tone if the proper relations are maintained. It will be understood that the arrangement of the areas 2ª and 3, just described, indicates the manner in which the chromatic musical scale is to be applied to colors of a spectrum to ascertain or determine the divisions of areas of color in the spectrum selected corresponding to the chromatic scale, but it will be also understood that this arrangement, as so far described, does not in an aggregate make or indicate any selection, segregation, or combination of colors as regards a harmonious effect desired.

With the scale of color indicated in the manner just described, I am able to apply the principle of making musical harmonies to the making of color harmonies by mechanical selection of the areas just described. It is known that the notes or musical intervals of the major scale, as indicated by the areas 2ª, are the foundation for composition of harmonious tone effects, and this will be true when the colors of the spectrum are arranged in the relation of the areas 3 to the note areas 2ª, that is, if the areas 3, corresponding to a harmonious tone combination of notes selected from the notes or tones C, D, E, F, G, A, B, are combined or used together, they will be in color harmony.

Beneath the areas 2ª, 3, and in horizontal arrangement, are arranged eleven horizontal rows 4 of indications, preferably in the form of areas, each row preferably consisting of areas arranged in horizontal sequence in number equal to the number of areas 3 depicting or indicating the colors of a spectrum. For convenience, I have referred both in the specification and in the claims to the areas 4 as being "beneath" the color areas or indications 3. It will, of course, be understood that the areas 4 could as well be arranged above the areas 3, and that when I claim the areas 4 as beneath the areas 3, I intend to cover an arrangement in which they are above said areas. The first or uppermost of these rows 4 is arranged with its areas or spaces in vertical alinement, respectively, with the areas in the row 3, so that the first area in the row is beneath the area corresponding to red (R) at the left of the chart, and the last of said areas is beneath the area indicating green blue (GB) at the right of the row 3. The second row of areas 4 is stepped one area to the right relative to rows 2, 3 and 4, so that the first area in said second row is beneath the area of red orange (RO), and the last is one step to the right of green blue (GB). In the third row the first area is beneath the area orange (O), and so on downward through the series of rows, each row being stepped one space to the right relative to the next preceding row. Each of these rows 4 contains preferably the same number of areas or spaces as are contained in the row 2 of musical notation, and the row 3 depicting in sequence the colors of the spectrum, and is adapted to facilitate selection of harmonious color combinations employing any one of the colors of the spectrum shown in row 3 as the key-note color. In each of the rows 4 I have indicated the seven different colors which correspond to the seven notes of the diatonic scale, based upon the key color with which the row begins. For example, in the first row wherein red is the first color, and therefore the key-note color, I have shown the spaces corresponding to red, orange, yellow, yellow-green, green-blue, blue-violet and violet-red and then again red, orange, yellow, yellow-green and green-blue in the order in which they appear in the spectrum, and in the positions which they bear relative to the musical notations in row 2, namely, C, D, E, F, G, A, B, C, D, E, F, G, respectively. Therefore this first row 4 represents in color-areas the colors corresponding to the so-called natural scale or scale of C, i. e., it presents a segregation of the diatonic scale of C represented in the corresponding colors of the spectrum. These spaces, corresponding to the notes of this particular diatonic scale, are shown as unshaded, as at 5, and the spaces which do not form part of this particular diatonic scale are shown as blocked by vertical lines, as indicated at 6. By this arrangement those colors with which the key-note 4 is in harmony, i. e. those which correspond to the diatonic scale or from which harmonious selections may be made, are segregated from the complete spectrum, so that this particular diatonic scale based upon this particular key-note color red (C) may be viewed and appreciated separately. In the particular embodiment of the arrangement just described, instead of leaving the spaces 5 blank, I may place therein words, or legends, or indicia (not shown), designating the particular color to which each space is appropriated, or I may, as I prefer to do, color such spaces with the correct color, so that the harmonious color combination itself may be clearly seen. I also prefer to completely indicate the absence from the particular diatonic scale of such colors as would appear in the complete chromatic scale, by blocking the areas 6, as for example, in the natural scale or scale of C (red), the area beneath each of the notes C#, D#, F#, G# and A#, shown as blocked in by vertical lines, may be dead-black to indicate the absence of the corresponding color from this diatonic scale.

What has been described as to the first row 4, representing the diatonic scale of C (red) is generally true of all the other rows 4, since each row represents the diatonic scale of the key-note of that row, and segregates the colors corresponding to the individual diatonic scale in their sequence as occurring in that scale, with omission of all colors or representations thereof which do not form part of the individual diatonic scale. In these rows 4 the spaces indicate the harmonious sequence of colors built on each key-note color with which each row begins, such spaces being harmonized according to the diatonic scale of music with half intervals between the third and fourth notes and the seventh and eighth notes, respectively. As heretofore stated, each of the rows 4 indicates those notes of the scale, based on the key note beginning the row, which are in harmony, and it will be seen that any combination embodying all these colors, or any combinations thereof which are in musical harmony according to the corresponding musical notation, as indicated by the row 2 of the note indications, will also be in musical harmony.

Any or all of the colors in a given row may be used in combination with the key-note color at the left. Thus all of the colors, orange yellow, yellow green, green blue, blue violet, and violet red, may be used with the red color at the left of the uppermost row. Similarly the colors orange yellow, yellow green, green blue, violet, and red, may be used with the key-note color red orange at the left of the second row.

It will be understood that the colors depicted in each of the rows 4 may be the true colors of the spectrum, or may be any tints, neutralizations, or gradations thereof, so long as the sequence of colors in each row maintains the proper relation or relative value of the color sequence of the spectrum, and these colors are arranged according to a musical notation as described. I also desire it understood that by the expressions "color indicating areas," and "color areas" used herein and in the appended claims, I include not only spectrum colors, but tints, neutrals and gradations thereof.

Figure 2:
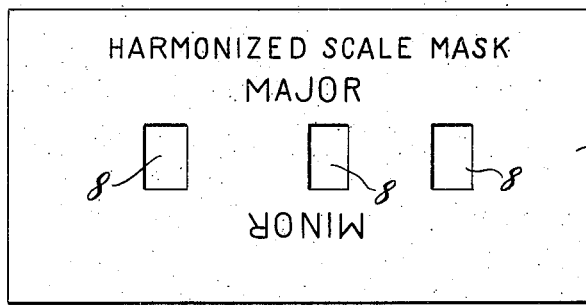
Fig. 2 is a plan view of a plate or mask adapted to be applied to the chart for the purpose of ascertaining or determining color combinations which will be harmonious.
Figure 3:
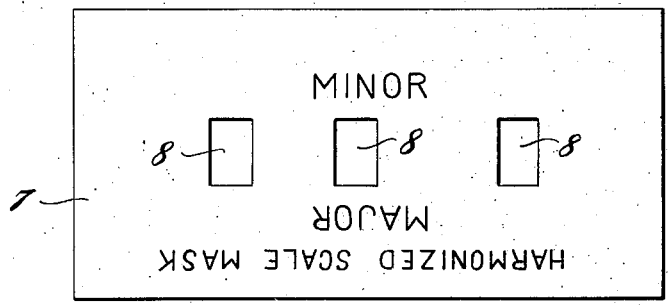
Fig. 3 is a plan view of the mask of Fig. 2 shown in reverse position, as when adapted to select harmonious color combinations other than those adapted to be selected by said mask when in the position shown in Fig. 2.

I also provide means whereby triads, or major and minor chords of musical harmony may be used as the basis for selecting from any row, i. e. from any diatonic scale of the eleven diatonic scales shown, corresponding color combinations which will be in color harmony. This means may take a number of forms, but preferably consists of an indicator in the form of a mask 7, having three openings 8 spaced so as to correspond to the major and minor chords on the scale shown in row 2, so that major or minor chords may be selected from any of the rows 4 corresponding to the major or minor chords based upon any desired key-note color. This mask, as shown in Fig. 2, shows the openings 8 spaced to produce or expose a major chord, and in Fig. 3 is shown the same mask reversed so that the same openings may be employed for exposing a minor chord. By the use of this form of indicating means, the major and minor chords of harmonious color may be selected. The colors appearing through the openings 8 when the mask is in the position shown in Fig. 2 will be a major chord of colors in harmony, and the colors appearing through the mask when the latter is in the position shown in Fig. 3 will be a minor chord of colors in harmony.

In order to select the first or diatonic chord of each color scale, the mask, in the position shown in Fig. 2, is arranged so that the first opening 8 will appear over the selected key-note color beginning one of the rows 4, and it will be found that the second and third colors appearing through the second and third openings of the mask will be in harmonious color relation to the key-note color, for example, if the first mask opening 8 is placed over red in the first row 4, the three colors exposed through the mask will be red, yellow and green-blue, corresponding to the musical notes C, E. and G, and these colors will be in harmonious color relation in the same manner as the notes C, E and G would be in musical harmonious relation. If red orange is selected as the key-note color, the mask is placed with its first opening over the first space in the second row 4, that is, that space beneath the note C#, and the space therebeneath marked red-orange, whereupon, it will be found that the colors red-orange, yellow-green and blue, corresponding to the notes C#, F and G#, will be exposed through the mask and will be in harmonious color relation. Such a triad not only forms a harmony in itself but with the key or base color of the scale forms a four color harmony. The same result appears employing any of the key-note colors beginning any of the rows 4, the key-note color appearing through the first opening in the mask, and the two colors in harmony therewith appearing through the second and third openings in the mask. When it is desired to find the second chord of a color scale of any of the rows 4, the mask is reversed to the position shown in Fig. 3 corresponding to the minor chord, and the mask is placed with the first opening at the left over the third space in the selected row 4, which space corresponds to the second note in the harmonious color scale of which each row 4 is composed. For example, if the first opening at the left of the mask is placed over the space indicated orange in the first row 4, it will be found that the colors orange, yellow-green and blue-violet will appear, and will be in harmonious color relation in the same manner as the musical notes D, F and A, corresponding to these colors, would be in musical harmony. The third chord of the musical scale is also a minor chord, and in order to obtain the harmonious color combination corresponding to the third or minor chord, it is only necessary to place the left-hand opening of the mask over the third color appearing in any one of the rows 4, whereupon the colors which are in harmony, corresponding to the third chord, will appear through the openings of the mask. For example, taking yellow as the key-note color, the mask will be placed with the first opening over the yellow space in line 1, and will be found that the colors yellow, green-blue and violet-red will appear through the openings and will be in proper harmonious color relation. The fourth and fifth chords, according to the musical scale, are major chords and are found by placing the mask with the major side up, that is, in the position shown in Fig. 2, and with the first opening 8 appearing over the fourth or fifth note of the scale, according to which it is desired to employ as the key-note color. The sixth chord is minor and will be found by turning the mask to the position shown in Fig. 3, and applying the same to the sixth note of the scale. The seventh chord, which corresponds to the diminished seventh in music, is not a definite triad, and therefore cannot be ascertained by the use of the mask. Accordingly the seventh note of each scale I have marked with a diagonal line 9 to indicate that the same is not to be used as the basis for either a major or minor chord, but it will be found that if the mask is inadvertently placed with its extreme left opening over the 7th note of any scale, the extreme right opening will register with one of the blank spaces 6, and therefore three colors will not be exhibited. It will also be noted that the 7th note of each diatonic scale is a different note, and the corresponding color is therefore barred as the basis of a harmonious chord only in the diatonic scale wherein it is the 6th note. For example, violet-red in the scale of C (red) is the 7th note, but in the scale of D (orange) it is the 6th note, and in the scale of E (yellow) it is the 5th note, and in the scale of F sharp (green) it is the 4th note, and in the scale of G (green-blue) it is the 3rd note, and in the scale of A (blue-violet) it is the 2nd note, and if the scale of B (violet-red) were shown it would be the 1st note. It may be made the basis of a major or minor chord in every one of these scales in which it appears except the scale of C.

It will therefore be evident that the selection of harmonious chords is a purely mechanical operation requiring no knowledge of music and no knowledge of the theory of color or of color harmonies.

Figure 4:
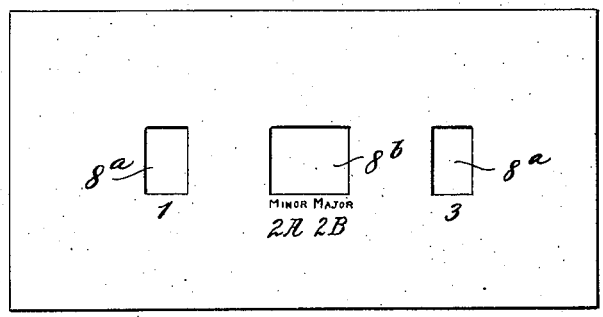
Fig. 4 is a plan view of another form of mask adapted to perform the function of the mask of Figs. 2 and 3 without reversing the same.

In Fig. 4 I have shown another form of mask adapted to perform the function of the mask shown in Figs. 2 and 3 without reversing the same. In this form the mask is provided with openings $8^a$ corresponding to the first and last openings 8 in the mask 7, but the intermediate openings $8^b$ are made of enlarged area as to correspond to the intermediate opening 8, whether in the position shown in Fig. 2, or that shown in Fig. 3. In the mask of Fig. 4 the middle color or note of the triad will appear through either the left half or right half of the area $8^b$, according as the minor or major triad is selected, and the other space appearing will be one of the blank spaces 6 shown as blocked in by vertical lines and which may be dead-black to completely indicate the absence of color. For convenience, I have marked the left half of the opening "minor" and the right half "major", so as to indicate clearly which triad is exposed through the openings of the mask.

It will thus be seen that I have provided a convenient chart in which each scale, based upon a selected keynote color from the spectrum, is extended shown in alignment so that the colors of the diatonic scale for each key note are segregated from the spectrum, thus permitting each individual scale to be viewed and appreciated separately and the desired harmonious color combinations readily selected therefrom and this selection can be made by one ignorant of music and of color harmonies.

In each of the rows 4 I have indicated those areas to be used as the basis for minor chord combinations, these being the second, third and sixth spaces or notes of each row, the preferred manner of indicating these minor chord areas being to block off the corners of each area, as indicated at 10, although I desire it understood that any suitable means for identifying these minor chord areas may be employed, or such identification may be omitted.

What I claim and desire to secure by Letters Patent of the United States is:—

1. A color harmony device consisting of a chart having a series of color areas in alinement in spectrum order, such colors constituting a complete harmonic scale, with blank spaces in the positions of the colors of the spectrum not forming part of such harmonic scale.

2. A color harmony device consisting of a chart having a series of color areas in alinement in spectrum order, such colors constituting a complete harmonic scale and a considerable part of another identical harmonic scale, with blank spaces in the positions of the colors of the spectrum not forming part of such harmonic scale.

3. In a color harmony device a series of color areas arranged in alinement in spectrum order constituting a harmonic series selected from the spectrum colors, said series including colors selected from one full range of the spectrum colors and a considerable part of a second range.

4. A color harmony device consisting of a chart having a series of color areas in alinement in spectrum order, such colors constituting a complete harmonic scale, with blank spaces in the positions of the colors of the spectrum not forming part of such harmonic scale, and a second adjacent series of color areas in alinement also in spectrum order and constituting a different complete harmonic scale also with blank spaces in the positions of the colors of the spectrum not forming part of such second harmonic scale.

5. A color harmony device consisting of a chart having a series of color areas in alinement in spectrum order, such colors constituting a complete harmonic scale and a considerable part of another identical harmonic scale, with blank spaces in the positions of the colors of the spectrum not forming part of such harmonic scale, and a second adjacent series of color areas in alinement also in spectrum order and constituting a different complete harmonic scale and a considerable part of another harmonic scale identical with such second harmonic scale also with blank spaces in the positions of the colors of the spectrum not forming part of such second harmonic scale.

6. In a color harmony device a series of color areas arranged in alinement in spectrum order constituting a harmonic series selected from the spectrum colors beginning with one color, said series including colors selected from one full range of the spectrum colors and a considerable part of a second range, and a second adjacent corresponding harmonic series of color areas beginning with another color.

7. A color harmony device consisting of a chart having a series of color areas in alinement in spectrum order, such colors constituting a complete harmonic scale, with blank spaces in the positions of the colors of the spectrum not forming part of such harmonic scale and other adjacent corresponding series of color areas successively beginning with the successive colors of the spectrum and each constituting a complete harmonic scale.

8. In a color harmony device a series of color areas in alinement in spectrum order, such colors constituting a complete harmonic scale and a considerable part of another identical harmonic scale, and other adjacent corresponding series of color areas successively beginning with the successive colors of the spectrum and each constituting a complete harmonic scale and a considerable part of another identical harmonic scale.

9. In a color harmony device a series of color areas arranged in alinement in spectrum order constituting a harmonic series selected from the spectrum colors beginning with one color, said series including colors selected from one full range of the spectrum colors and a considerable part of a second range, and other adjacent corresponding harmonic series of color areas successively beginning with the successive colors of the spectrum.

10. In a color harmony device a series of color areas in alinement in spectrum order, such colors constituting a complete harmonic scale and a considerable part of another identical harmonic scale, and other adjacent corresponding series of color areas successively beginning with the successive colors of the spectrum and each constituting a complete harmonic scale and a considerable part of another identical harmonic scale, identical colors of the spectrum being alined in columns, with intervening blank spaces where the colors of the columns do not form part of the respective scales.

11. In a color harmony device a series of color areas arranged in alinement in spectrum order constituting a harmonic series selected from the spectrum colors beginning with one color, said series including colors selected from one full range of the spectrum colors and a considerable part of a second range, and other adjacent corresponding harmonic series of color areas successively beginning with the successive colors of the spectrum, identical colors of the spectrum being alined in columns, with intervening blank spaces where the colors of the columns do not form part of the respective scales.

12. A color harmony device consisting of a chart having a series of color areas in alinement in spectrum order, such colors constituting a complete harmonic scale, with blank spaces in the positions of the colors of the spectrum not forming part of such harmonic scale, and a mask shiftable along said series for selecting groups of colors harmonizing with the key color of the scale.

13. A color harmony device consisting of a chart having a series of color areas in alinement in spectrum order, such colors constituting a complete harmonic scale and a considerable part of another identical harmonic scale, with blank spaces in the positions of the colors of the spectrum not forming part of such harmonic scale, and a mask shiftable along said series for selecting groups of colors harmonizing with the key color of the scale.

14. In a color harmony device a series of color areas arranged in alinement in spectrum order constituting a harmonic series selected from the spectrum colors, said series including colors selected from one full range of the spectrum colors and a considerable part of a second range, and a mask shiftable along said series for selecting groups of colors harmonizing with the key color of the series.

In testimony whereof I have hereunto signed my name.

HAZEL H. ADLER.